United States Patent
Hafermalz et al.

(10) Patent No.: US 12,157,521 B2
(45) Date of Patent: Dec. 3, 2024

(54) STEERING GEAR AND STEERING SYSTEM

(71) Applicant: Robert Bosch GmbH, Stuttgart (DE)

(72) Inventors: Jens-Uwe Hafermalz, Waeschenbeuren (DE); Dennis Fuechsel, Schwaebisch Gmünd (DE)

(73) Assignee: Robert Bosch GmbH, Stuttgart (DE)

( * ) Notice: Subject to any disclaimer, the term of this patent is extended or adjusted under 35 U.S.C. 154(b) by 1595 days.

(21) Appl. No.: 16/463,590

(22) PCT Filed: Oct. 6, 2017

(86) PCT No.: PCT/EP2017/075517
§ 371 (c)(1),
(2) Date: May 23, 2019

(87) PCT Pub. No.: WO2018/095639
PCT Pub. Date: May 31, 2018

(65) Prior Publication Data
US 2019/0315389 A1 Oct. 17, 2019

(30) Foreign Application Priority Data
Nov. 24, 2016 (DE) ...................... 10 2016 122 644.0

(51) Int. Cl.
*B62D 5/04* (2006.01)
*F16H 55/24* (2006.01)
*F16H 57/021* (2012.01)

(52) U.S. Cl.
CPC ........... *B62D 5/0409* (2013.01); *F16H 55/24* (2013.01); *F16H 2057/0213* (2013.01)

(58) Field of Classification Search
CPC .................. B62D 5/0409; F16H 55/24; F16H 2057/0213
See application file for complete search history.

(56) References Cited

U.S. PATENT DOCUMENTS 4,040,307 A * 8/1977 Koster ...................... F16H 1/16
74/425
5,186,068 A * 2/1993 Heller ...................... F16H 1/16
74/401

(Continued)

FOREIGN PATENT DOCUMENTS

CN 102770675 A 11/2012
DE 1 025 281 B 2/1958

(Continued)

OTHER PUBLICATIONS

International Search Report corresponding to PCT Application No. PCT/EP2017/075517, mailed Jan. 23, 2018 (German and English language document) (7 pages).

*Primary Examiner* — Frank B Vanaman
(74) *Attorney, Agent, or Firm* — Maginot, Moore & Beck LLP (57) ABSTRACT

A steering gear for a steering system of a motor vehicle includes a housing, toothed wheel, pinion shaft, floating bearing, and fixed bearing. The shaft includes a first portion, a second portion, and a pinion therebetween meshed with the wheel. The fixed bearing includes a bearing sleeve, an outer bearing ring a rotary bearing received in the sleeve, and a pivoting ring with inner and outer rings pivotably connected via at least one torsion bar. The inner ring is built into or connected to the sleeve, and the outer ring is fixed in the housing. The first portion is received in the rotary bearing. The floating bearing includes a further rotary bearing radially moveably mounted in the housing, and having a further outer bearing ring connected to one or more of the sleeve and the outer bearing ring via a connecting element. The second portion is received in the further rotary bearing.

10 Claims, 2 Drawing Sheets

(56) References Cited

U.S. PATENT DOCUMENTS

| | | | | |
|---|---|---|---|---|
| 5,482,127 A * | 1/1996 | Eda | ............... | B62D 5/0409 |
| | | | | 180/443 |
| 6,357,313 B1 * | 3/2002 | Appleyard | ............ | H02K 7/081 |
| | | | | 384/255 |
| 6,364,049 B1 * | 4/2002 | Iwasaki | ............... | B62D 5/0409 |
| | | | | 384/526 |
| 2009/0314114 A1 * | 12/2009 | Grosberg | ............... | F16H 55/24 |
| | | | | 74/409 |
| 2010/0260448 A1 * | 10/2010 | Hafermalz | ............ | F16C 35/077 |
| | | | | 384/215 |
| 2010/0275708 A1 * | 11/2010 | Daniel | ............... | F16H 57/022 |
| | | | | 74/405 |
| 2012/0272765 A1 | 11/2012 | Fuechsel et al. | | |
| 2014/0202274 A1 | 7/2014 | Durand et al. | | |

FOREIGN PATENT DOCUMENTS

| | | |
|---|---|---|
| DE | 26 19 989 A1 | 11/1976 |
| DE | 10 2005 035 020 A1 | 2/2007 |
| DE | 10 2008 043 792 A1 | 5/2010 |
| DE | 10 2009 054 655 A1 | 6/2011 |
| DE | 10 2013 104 521 A1 | 11/2014 |
| EP | 0 270 159 A2 | 6/1988 |
| JP | 2000-240764 A | 9/2000 |
| JP | 2003-74676 A | 3/2003 |
| JP | 2009-287647 A | 12/2009 |
| JP | 2012-154432 A | 8/2012 |
| JP | 2016-522874 A | 8/2016 |

* cited by examiner

STEERING GEAR AND STEERING SYSTEM

The invention relates to a steering gear for a steering system and to a corresponding steering system, in particular a power steering system, for a motor vehicle.

In most motor vehicles, there are installed power steering systems which, during steering maneuvers, generate an assisting torque and thereby reduce the steering moment that has to be imparted to the steering column by the driver.

The known power steering systems are based on a steering gear which converts the drive power of a hydraulic or electric steering motor and transmits this to, for example, the steering column. Such steering gears may be designed in the form of a helical rolling-contact gear and in particular as a helical-wheel gear or worm gear. These then comprise a toothed wheel, which may be connected directly or indirectly to the steering column, and a pinion which meshes with said toothed wheel and which is driven by the steering motor via a shaft.

What has been found to be a problem in the case of such steering gears is gear play which arises owing to component tolerances, different thermal expansions of the gear elements and/or owing to wear. In particular during so-called alternating steering, that is to say during directly successive steering maneuvers with an alternating steer angle direction, such gear play generates undesired noises, which result from the alternating abutment of opposite flanks of the teeth of pinion and toothed wheel.

It is known for such gear play to be eliminated as far as possible by virtue of the pinion shaft being mounted so as to be pivotable about an axis running perpendicular to the longitudinal axis of the pinion shaft and at a distance from the toothing engagement of pinion and toothed wheel, and being pressed against the toothed wheel by means of one or more spring elements.

The pivotability of the pinion shaft is in this case generally integrated into one of the two bearing arrangements by means of which the pinion shaft is mounted at the ends. This bearing arrangement is referred to as "fixed bearing". The bearing arrangement in the region of the other end is then designed with a defined play (so-called "floating bearing"; cf. for example DE 10 2005 035 020 A1) in order to permit the deflection caused by the pivoting movement. The fixed bearing is generally provided at the drive side, whereas the floating bearing is provided at the free end of the pinion shaft. The one or more spring elements for pressing the pinion against the toothed wheel may in this case be integrated both into the floating bearing and into the fixed bearing.

A steering gear of said type, in which the spring force for the spring loading is generated by means of the fixed bearing, is known for example from DE 10 2009 054 655 A1. In the case of this steering gear, provision is made for a ball bearing, which receives the pinion shaft in the region of the fixed bearing, to be mounted at the outside in a pivot sleeve. The pivot sleeve comprises a bearing sleeve, which receives the ball bearing substantially without play, and an outer ring, which is held substantially without play in a receptacle of a housing of the steering gear, wherein the outer ring and the bearing sleeve are connected by means of multiple torsion webs which are twisted in the event of the outer ring rotating relative to the bearing sleeve. After the assembly of the steering gear, the torsion webs are twisted such that the elastic restoring action thereby generated effects the spring loading of the pinion shaft.

In the case of a steering gear as per DE 10 2009 054 655 A1, the restoring moment of the elastically twisted torsion webs is transmitted via the ball bearing to the pinion shaft in order to press the latter against the toothed wheel. This has the effect that an outer bearing ring, which is mounted within the bearing sleeve, and an inner bearing ring, which receives the pinion shaft, of the ball bearing are acted on with a load which would cause tilting of said components about an axis oriented radially with respect to the longitudinal axis of the ball bearing. This load must be supported by the balls of the ball bearing in interaction with the bearing rings. This results, in particular in the case of the ball bearing being embodied as a single-row radial ball bearing as per DE 10 2009 054 655 A1, in relatively large dimensioning of the ball bearing, which leads overall to a relatively large and also heavy steering gear. A relatively large steering gear can however be integrated into a motor vehicle only with difficulty or at least in a disadvantageous manner. Furthermore, a relatively heavy steering gear opposes the basically sought lightweight construction of motor vehicles.

The invention is based on the object of improving a steering gear such as is known from DE 10 2009 054 655 A1 with regard to size and thus with regard to the structural space required for the integration thereof into a motor vehicle, or reducing the size of said steering gear.

Said object is achieved by means of a steering gear as claimed in patent claim 1. A steering system having a steering gear of said type is the subject of patent claim 10. Advantageous embodiments of the steering gear according to the invention and thus also of the steering system according to the invention are the subjects of the dependent patent claims and/or emerge from the following description of the invention.

According to the invention, a steering gear for a steering system of a motor vehicle is provided, which has a housing, a toothed wheel, a pinion, in particular helical pinion, which meshes with the toothed wheel, and a (helical) pinion shaft which comprises the pinion.

The pinion shaft is mounted on one side of the pinion in a fixed bearing, which comprises a rotary bearing in which the pinion shaft is received. For this purpose, the rotary bearing comprises at least one inner bearing ring and one outer bearing ring and possibly, in the case of a preferred embodiment as a rolling bearing and in particular as a ball bearing, multiple rolling elements, in particular balls, arranged between the bearing rings, wherein the pinion shaft is received within the inner bearing ring of the rotary bearing. The rotary bearing and in particular the outer bearing ring of the rotary bearing of the fixed bearing is furthermore received in a bearing sleeve. Furthermore, the fixed bearing comprises a pivot ring which has an outer ring and an inner ring which are pivotably connected to one another by means of one or more torsion webs, wherein the inner ring is connected to or is an integral constituent part of the bearing sleeve, and the outer ring is arranged fixedly (with regard to at least one direction, preferably with regard to all directions, that is to say immovably) in the housing of the steering gear.

Furthermore, the pinion shaft of a steering system according to the invention is mounted on the other side of the pinion in a floating bearing which comprises a rotary bearing in which the pinion shaft is received, wherein radial mobility within the housing is ensured for the rotary bearing (and thus also for that end of the pinion shaft which is received in said rotary bearing). Provision may preferably be made for the rotary bearing and in particular an outer ring thereof to be received in a bearing bushing which is mounted in the housing, wherein the bearing bushing ensures radial mobility of the rotary bearing within the housing. Such a floating bearing may for example have an embodiment as per DE 10 2005 035 020 A1. In particular, provision may be made for the bearing bushing of the floating bearing to have an inner bushing, which receives the rotary bearing, and an outer bushing, which surrounds the inner bushing and which is arranged fixedly in the housing, wherein the outer bushing and the inner bushing delimit an annular gap, and wherein the outer bushing and the inner bushing are connected to one another by means of a flexible connecting portion such that said outer bushing and inner bushing are movable relative to one another in at least one radial direction. The rotary bearing of the floating bearing of the steering gear according to the invention comprises at least one inner bearing ring and one outer bearing ring and possibly, in a preferred embodiment as a rolling bearing and in particular as a ball bearing, multiple rolling elements, in particular balls, arranged between the bearing rings, wherein the pinion shaft is received within the inner bearing ring and the outer bearing ring is received in particular directly within the inner bushing of the bearing bushing of the floating bearing.

Such a steering system is, according to the invention, characterized in that the bearing sleeve and/or an outer bearing ring of the rotary bearing of the fixed bearing is connected by means of a single-part or multi-part connecting element directly or indirectly (for example via a bearing bushing of the floating bearing, in particular via an inner bushing of a bearing bushing of said type) to an outer bearing ring of the rotary bearing of the floating bearing. The connecting element is in this case designed so as to conduct at least a load that leads to tilting of the outer ring of the rotary bearing of the fixed bearing directly or indirectly to the outer ring of the rotary bearing of the floating bearing.

By means of the refinement according to the invention of a generic steering gear that is fundamentally known from DE 10 2009 05 4 655 A1, it is achieved that the restoring moment of the elastically twisted torsion webs of the pivot ring of the fixed bearing is no longer transmitted exclusively via the rotary bearing of the fixed bearing to the pinion shaft in order to press the latter against the toothed wheel, it rather being the case that the pivot loading of the bearing sleeve of the fixed bearing that results from the restoring moment is additionally or primarily transmitted via the connecting element to the rotary bearing of the floating bearing and thus to that end of the pinion shaft which is mounted therein. In conjunction with contact between the pinion and the toothed wheel that is arranged between the fixed bearing and the floating bearing, the result is a substantially radially oriented loading of the rotary bearing caused by the restoring moment of the twisted torsion webs. A transmission of a tilting moment of a relevant magnitude, based on this restoring moment of the torsion webs, from the rotary bearings and in particular from the rotary bearing of the fixed bearing to the pinion shaft is therefore not provided. This advantageously makes it possible for the rotary bearing of the fixed bearing and/or the rotary bearing of the floating bearing to be of relatively small dimensions, which can have a positive effect with regard to the size and the weight and with regard to the production costs of a steering gear according to the invention. Furthermore, a rotary bearing which is of relatively simple design from a structural aspect, preferably a single-row radial ball bearing, can be selected for the fixed bearing and/or the floating bearing, which can likewise have a positive effect with regard to the size and the weight and with regard to the production costs of a steering gear according to the invention.

As an alternative to a mounting of the rotary bearing of the floating bearing within a bearing bushing, provision may for example also be made for said rotary bearing or an outer ring thereof to be mounted (also exclusively) in the connecting element, through which a pivoting of the pinion shaft is thus conducted. Here, defined stops of the housing can limit a radial mobility of the rotary bearing of the floating bearing or of that end of the connecting element which receives said rotary bearing.

In a preferred embodiment of a steering gear according to the invention, provision may be made for the connecting element to be at least partially of tubular form. In particular, provision may be made for the connecting element to be of tubular form over its entire length and to surround the pinion shaft, wherein an (preferably the only) (passage) opening arranged in the region of the pinion is provided in the tube casing of the connecting element, which opening extends over a part of the circumference and a part of the length of the tube casing and permits engagement of the pinion with the toothed wheel. A tubular connecting element of said type is relatively flexibly rigid (in particular in relation to the component weight), which permits an advantageous transmission of a pivoting load from the bearing sleeve and/or the outer bearing ring of the rotary bearing of the fixed bearing to the floating bearing.

In an embodiment of a steering gear according to the invention which is advantageous in particular for manufacturing reasons, provision may be made for the connecting element to be formed integrally with the bearing sleeve (that is to say at least directly connected to one another) and preferably in one piece with the bearing sleeve (that is to say not connected to one another by means of separate connecting elements), in particular also materially integrally with the bearing sleeve.

In particular in the case of such an embodiment of a steering gear according to the invention, provision may then also be made for the rotary bearing of the floating bearing to be mounted directly or indirectly within an (end) portion of the connecting element and for a (the same or a different) portion of the connecting element to be mounted directly or indirectly within the bearing bushing of the floating bearing. This can lead in particular to relatively good assemblability of a steering system according to the invention of said type.

One advantageous refinement of a steering gear according to the invention, in particular of a steering gear according to the invention as per one or both of the embodiments mentioned above, may be characterized in that the connecting element and preferably also the bearing sleeve of the fixed bearing is formed from metal and/or the bearing bushing is formed from plastic, in particular from a thermoplastic material, or an elastomer. By means of a metallic embodiment of the connecting element, it is possible to realize an advantageous load-bearing capability for this, and thus an advantageous transmission of a pivoting load from the bearing sleeve and/or from the outer bearing ring of the rotary bearing of the fixed bearing to the floating bearing, with relatively low production costs. By contrast, an embodiment of the bearing bushing composed of plastic may be positively distinguished in particular with regard to the noise characteristics of the steering gear during operation.

Alternative embodiments of steering gears according to the invention are likewise possible. For example, the connecting element may (alternatively or additionally) be formed integrally, in one piece and/or materially integrally with the outer bearing ring of the rotary bearing or with the bearing bushing (in particular with an inner bushing that is preferably provided for the bearing bushing). Provision may likewise be made for the rotary bearing of the fixed bearing to be mounted within a portion of the connecting element and for a/said portion of the connecting element to be mounted within the bearing bushing of the fixed bearing.

A steering system according to the invention comprises at least one steering gear according to the invention and a steering motor which is connected with rotational driving action to the pinion shaft. The toothed wheel of the steering gear may furthermore be connected rotationally conjointly or with rotational driving action to a steering shaft, in particular a steering column, of the steering system. The steering system according to the invention may in particular be in the form of a power steering system in the case of which an assisting torque can be generated by means of the steering motor, such that a steering moment that is to be imparted to the steering column, for the purposes of steering the motor vehicle, by a driver of a motor vehicle which comprises the power steering system is reduced (possibly temporarily even to zero). Alternatively, it is also possible for the steering system to be designed such that the entire steering moment required for the purposes of steering is generated (at all times) by the steering motor (in particular for a so-called steer-by-wire functionality of the steering system or of the motor vehicle, in the case of which there is no mechanical connection between a steering handle (if one is provided at all) and the steerable wheels).

The invention also relates to a motor vehicle having a steering system according to the invention.

The indefinite articles ("a", "an", "of a" and "of an"), in particular in the patent claims and in the description that generally discusses the patent claims, are to be understood as such and not as numerals. Components discussed in concrete terms using these are thus to be understood as being present at least singly, and as being capable of being present in a multiplicity.

The invention will be discussed in more detail below on the basis of an exemplary embodiment illustrated in the drawings. In the drawings.

Figure 1:
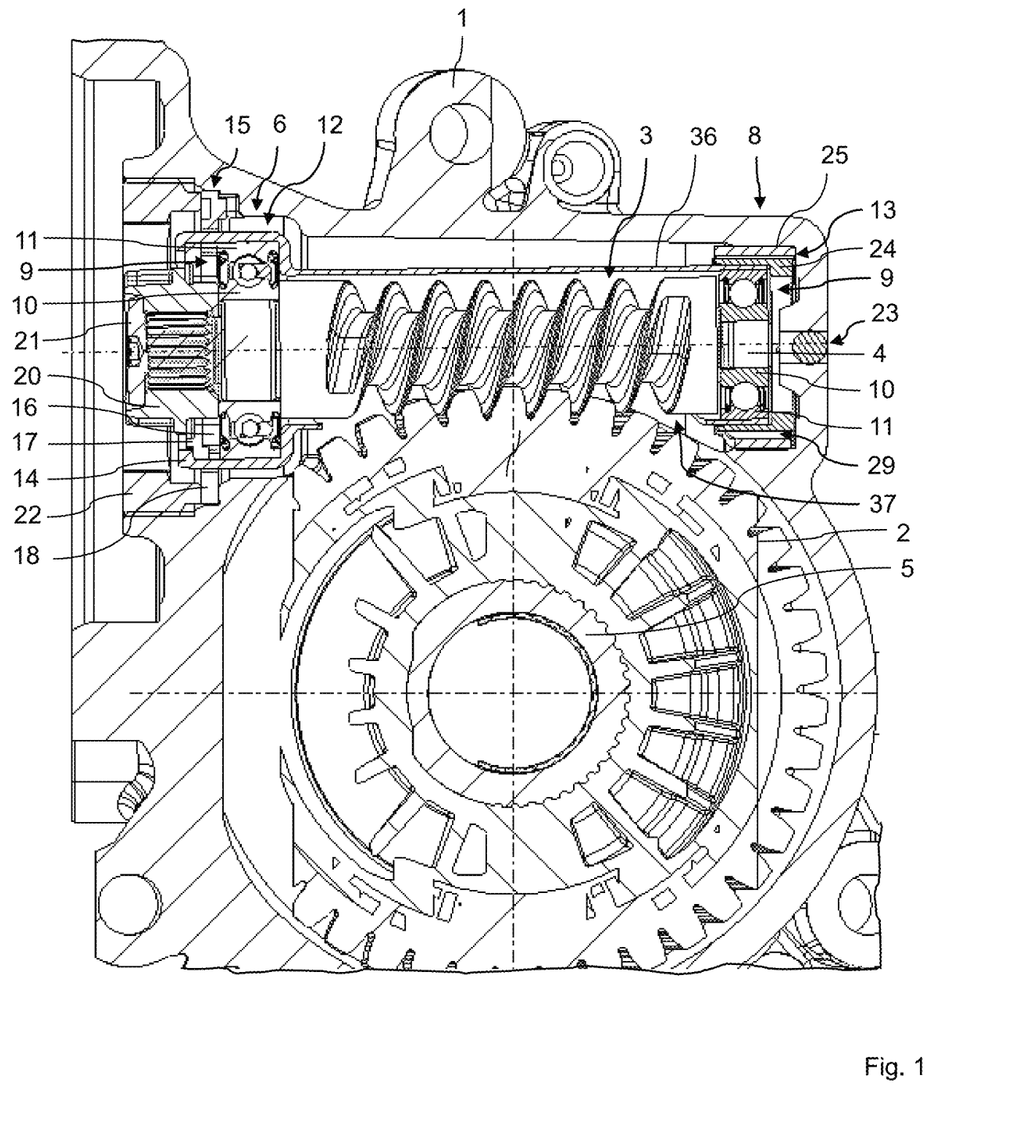
FIG. 1 shows a longitudinal section through a steering gear according to the invention.

FIG. 1 shows the main constituent parts of a steering gear according to the invention. Said steering gear comprises a housing 1, within which housing there are rotatably arranged a toothed wheel 2 and a pinion 3 which meshes with the toothed wheel 2 and which is in the form of a helical pinion. The pinion 3 and a (helical) pinion shaft 4 which comprises the pinion 3 are formed integrally in the form of a worm.

The toothed wheel 2 is fastened fixedly to an output shaft 5 (cf. FIG. 1) of the steering gear. Said output shaft 5, which in the exemplary embodiment shown has a toothing for a secure rotationally conjoint connection to the toothed wheel 2, may for example mesh with a steering rod which is formed at least in one portion as a toothed rack, whereby the toothed rack performs a translational movement which can, in a known manner, be converted by means of wheel steering levers (not illustrated) into a pivoting movement of steerable wheels (not illustrated) of the motor vehicle. The output shaft 5 may however also be a steering column of a power steering system, which steering column is connected to a steering wheel and acts via a steering pinion on the steering rod.

Figures 2, 3:
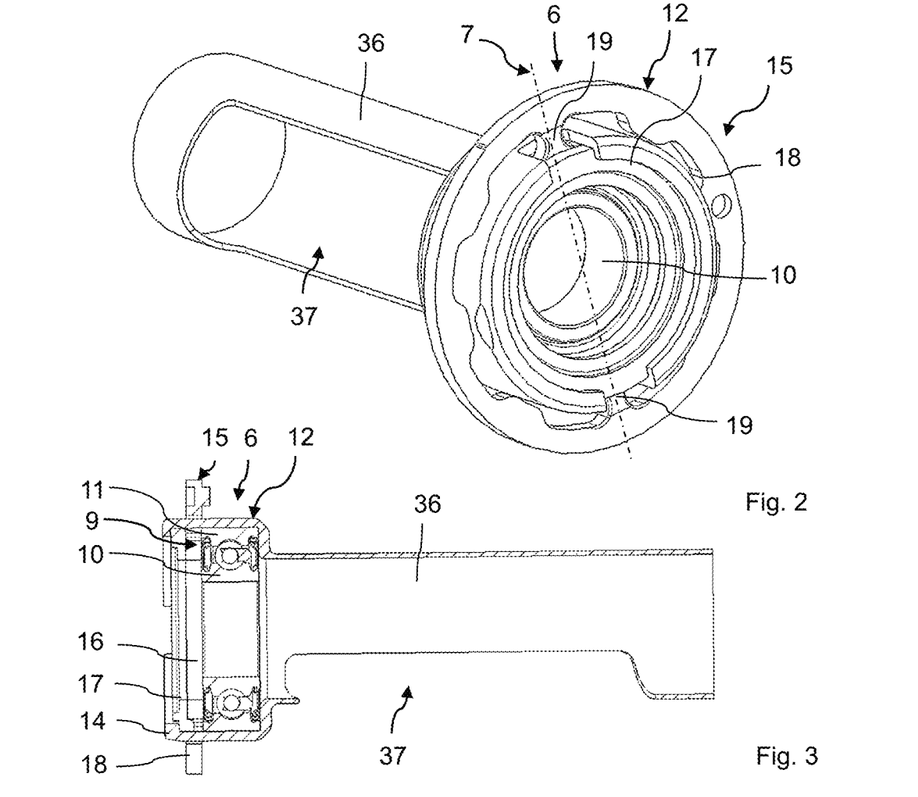
FIG. 2 shows the fixed bearing, and the connecting element integrated therein, of the steering gear as per FIG. 1 in a perspective view.
FIG. 3 shows the fixed bearing with integrated connecting element as per FIG. 2 in a longitudinal section.

The pinion shaft 4 has a drive-side end, by means of which said pinion shaft is connectable to the output shaft of a steering motor (not illustrated; for example an electric motor). In the region of said drive-side end, the pinion shaft 4 is mounted by means of a first bearing arrangement in the housing 1. This bearing arrangement is formed as a fixed bearing 6, which permits pivoting of the pinion shaft 4 about a pivot axis 7 (cf. FIG. 2). This pivoting gives rise to a deflection of that end of the pinion shaft 4 which is situated opposite the drive-side end, which pinion shaft is mounted there by means of a floating bearing 8 in a corresponding receptacle of the housing 1. Said floating bearing 8 is designed to permit the deflection of said end that results from the pivoting of the pinion shaft 4.

Both the fixed bearing 6 and the floating bearing 8 comprise in each case one rotary bearing in the form of a ball bearing 9. The corresponding portions of the pinion shaft 4 are mounted in inner bearing rings 10 of said ball bearings 9, whereas outer bearing rings 11 of the ball bearings 9 are mounted in in each case one bearing device 12, 13, which bearing devices are in turn received in corresponding receptacles of the housing 1. The bearing devices 12, 13 are structurally designed so as to permit, in the case of the fixed bearing 6, the pivoting of the pinion shaft 4 about the pivot axis 7 and, in the case of the floating bearing 8, the deflection of the free end of the pinion shaft 4.

For this purpose, the bearing device 12 of the fixed bearing 6 comprises a bearing sleeve 14 with circular-ring-shaped cross section, which, at an inner side, in a first longitudinal portion, receives the associated ball bearing 9 and, in a second longitudinal portion, receives an inner ring 16 of a pivot ring 15. Said inner ring 16 of the pivot ring 15 is, with the interposition of a support disk 17, mounted rotationally fixedly and in an axially secured manner within the bearing sleeve 14, wherein the inner ring 16 is supported on the outer bearing ring 11 of the ball bearing 9 of the fixed bearing 6. The pivot ring 15 comprises not only the inner ring 16 but also an outer ring 18. The outer ring 18 is connected via two torsion webs 19 (cf. FIG. 2) to the inner ring 16. The outer ring 18, the inner ring 16 and the torsion webs 19 are preferably formed as a single piece, for example from spring steel.

The ball bearing 9 of the fixed bearing 6 is axially secured in position on the pinion shaft 4, with the interposition of a thrust piece 20, by means of a screw 21 which is screwed into an internal thread integrated into the drive-side end of the pinion shaft 4. The outer ring 18 of the pivot ring 15 is axially secured in position within the housing 1 by means of a screw ring 22 which has an external thread which is screwed into a corresponding internal thread of the housing 1.

The two torsion webs 19 define the position of the pivot axis 7 about which the outer ring 18 is pivotable relative to the inner ring 16 of the pivot ring 15. The torsion webs 19 and thus the pivot axis 7 however in this case run not through the center of the pivot ring 15 and thus also not through the center of the cross section of the pinion shaft 4 but rather so as to be radially offset in relation thereto (cf. FIG. 2). The pivot axis 7 thus does not intersect the longitudinal axis 23 of the pinion shaft 4. Owing to the radial offset of the torsion webs 19 relative to the center of the pivot ring 15, the pivot axis 7 is relocated into the vicinity of the outer circumference of the pinion shaft 4, whereby the generation of reaction moments that arise or would arise owing to the toothing forces that are generated during the toothing engagement of pinion 3 and toothed wheel 2, in conjunction with the spacing of the line of action of said toothing forces from the pivot axis 7, can be reduced or eliminated. For the most complete possible elimination of these reaction moments, provision is made for the pivot axis 7 to lie within that tangential plane which is formed at the contact point of the two pitch circles or rolling circles of toothed wheel 2 and pinion 3.

The torsion webs 19 of the pivot ring 15 not only permit a pivoting of the outer ring 18 relative to the inner ring 16 and thus of the helical pinion shaft 4 relative to the toothed wheel 2 or to the housing 1 but simultaneously also impart the spring force by means of which the pinion 3 of the pinion shaft 4 is forced into the toothing of the toothed wheel 2 in order to realize the least possible gear play and thus correspondingly little generation of noise during the operation of the steering gear, in particular during so-called alternating steering. Said spring force arises from the fact that, during the assembly of the steering gear, the pinion shaft 4 is deflected, owing to contact with the toothed wheel 2, to such an extent as to generate sufficient torsion of the torsion webs 19, whereby the elastic restoring moments resulting from the torsion of the torsion webs 19 act counter to said deflection of the pinion shaft 4 and thus force the latter against the toothed wheel 2.

Figure 4:
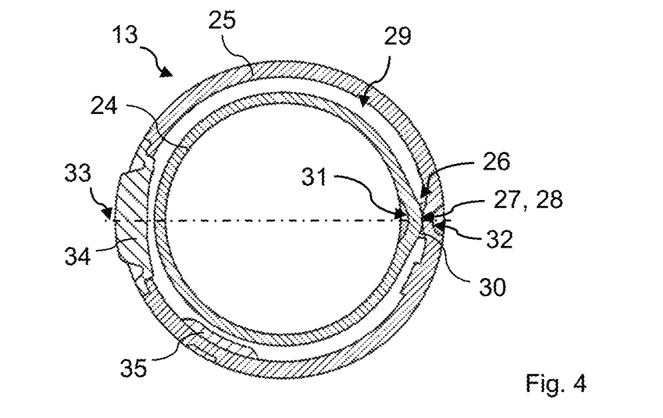
FIG. 4 shows the bearing bushing of the floating bearing of the steering gear as per FIG. 1 in a cross section.

The bearing device 13 of the floating bearing 8 is in the form of a bearing bushing 13 which comprises an inner bushing 24 which, in an unloaded neutral position of the bearing bushing 13, is arranged as far as possible concentrically within an outer bushing 25 (cf. FIG. 4). In one portion, the inner bushing 24 is connected by means of a connecting portion 26 to the outer sleeve 25. In the region of the connecting portion 26, the inner bushing 24 and the outer bushing 25 each have, in cross section or radial section (cf. FIG. 4), a projection 27, 20 which runs in curved fashion, which projections project—oppositely—into the annular gap 29 formed between the inner bushing 24 and the outer bushing 25. Here, the tips of the two projections 27, 28 make contact.

In the region of the projections 27, 28, the inner bushing 24 and the outer bushing 25 are surrounded by an elastomer casing 30. Here, the elastomer casing 30 is designed such that it does not project beyond the outer surfaces of the inner bushing 24 and of the outer bushing 25. For this purpose, firstly, the axial length of the inner bushing 24 and of the outer bushing 25 is smaller in the circumferential portions that form the projections 27, 28 than in the other circumferential portions. In this way, depressions (not visible) are formed in which the elastic material of the elastomer casing 30 is received. Furthermore, the inner bushing 24 has, on its inner side, and the outer bushing 25 has, on its outer side, in each case a further depression 31, 32 running in an axial direction, wherein the material of the elastomer casing 30 is likewise received in said depressions 31, 32. In the region of the annular gap 29, too, the projections 27, 28 are surrounded at both sides (in a circumferential direction) by the elastic material of the elastomer casing 30, or are embedded in said material. The elastomer casing 30 serves to hold the inner bushing 24 and the outer bushing 25 together, wherein, at the same time, a defined relative movement of said components is made possible. Specifically, the connecting portion 26 forms a pivot joint with a low pivoting moment, which permits pivoting of the outer bushing 25 relative to the inner bushing 24 about a pivot axis situated in the region of the connecting portion 26. During this pivoting movement, the projections 27, 28 of the inner bushing 24 and of the outer bushing 25 slide or roll on one another, whereas the elastomer casing 30 does not impede this relative movement of inner bushing 24 and outer bushing 25 to a relevant extent.

Provision is made for the bearing bushing 13 to be integrated into the housing 1 of the steering gear such that the pivoting of the pinion shaft 4 about the pivot axis 7 defined by the fixed bearing 6 leads to a displacement of the inner bushing 24 relative to the outer bushing 25 in a direction which is substantially perpendicular to the radial axis 33 leading through the connecting portion 26. By contrast, in the directions pointing along said radial axis 33, as far as possible no displaceability of the inner bushing 24 relative to the outer bushing 25 should be possible, in order to avoid distortion of the pinion 3 on the toothed wheel 2 during the operation of the steering gear. This is achieved in that the spacing between the inner bushing 24 and the outer bushing 25 is, in that circumferential portion of the bearing bushing 13 which is situated radially opposite the connecting portion 26, restricted to a relatively small value of for example 0.1 mm. This is realized by means of a delimiting element 34 which is mounted, displaceably in a radial direction, within the outer bushing 25. The delimiting element 34 has a radial width which is greater than the radial width of the outer bushing 25, wherein the delimiting element 34 of the bearing bushing 13 that has not yet been installed in the housing 1 can be displaced outward to such an extent that it projects beyond the outer surface of the outer bushing 25. In this way, a relatively large spacing is set between the outer side of the inner bushing 24 and the delimiting element 34, which spacing permits relatively easy installation of the bearing bushing 13. Said spacing is reduced to the desired small dimension during the course of the installation of the floating bearing 8 in the housing 1, because then the delimiting element 34, owing to a collision with the housing 1, can no longer project beyond the outer surface of the outer bushing 25, and must consequently be displaced in the direction of the inner bushing 24.

The outer bushing 25 of the bearing bushing 13 furthermore also comprises an elastic stop element 35 which delimits a movement of the inner bushing 24 in one direction (upward in FIG. 1) during a pivoting of the pinion shaft 4.

The steering gear furthermore also comprises a connecting element 36 which is integrated (as a single piece and materially integrally) into the bearing sleeve 14 of the fixed bearing 6, or which is formed as an elongation of said bearing sleeve. As can be seen in particular from FIGS. 2 and 3, the elongation element 36 is of tubular form with a (partially) circular-ring-shaped cross section, wherein this forms a casing opening 37 which is arranged in a central portion with respect to the longitudinal axis 23 of the connecting element 36 and extends over a portion of the circumference thereof. Through said casing opening 37, a portion of the toothed wheel 2 can project into the internal volume which is delimited by the connecting element 36, and which receives the pinion shaft 4 in the portion which forms inter alia the pinion 3, in order to permit an engagement of the toothed wheel 2 with the pinion 3.

A (tubular) end portion of the connecting element 36 extends into the floating bearing 8 of the steering gear, wherein the ball bearing 9 of the floating bearing 8 is mounted with the associated outer bearing ring 11 within said end portion of the connecting element 36, whereas the end portion is in turn mounted at the inside in the inner bushing 24 of the bearing bushing 13 of the floating bearing 8.

By means of the connecting element 36, it is achieved that the elastic resetting moments which result from the torsion of the torsion webs 19 of the pivot ring 15 of the fixed bearing 6 are not transmitted exclusively via the ball bearing 9 of the fixed bearing 6 to the pinion shaft 4, which would be associated with a relatively high tilting load of said ball bearing 9. Rather, said elastic restoring moments are transmitted primarily by the bearing sleeve 14 of the fixed bearing 6 and the connecting element 36, connected integrally thereto, to the ball bearing 9 of the floating bearing 8, wherein the loading of said ball bearing 9 that is caused as a result of this is realized substantially in the form of forces acting in a radial direction with respect to the longitudinal axis 23. Accordingly, said ball bearing 9 is also not loaded with a tilting moment of relevant magnitude.

Since it is consequently not necessary for either of the two ball bearings 9 to transmit a tilting moment of relevant magnitude to the pinion shaft 4, said ball bearings can advantageously be of relatively small dimensions and can furthermore be in the form of single-row radial ball bearings 9 of relatively simple construction, which has a positive effect with regard to the size, the weight and the production costs of the steering gear.

LIST OF REFERENCE DESIGNATIONS

1 Housing
2 Toothed wheel
3 (Helical) pinion
4 (Helical) pinion shaft
5 Output shaft of the steering gear
6 Fixed bearing
7 Pivot axis
8 Floating bearing
9 (Radial) ball bearing
10 Inner bearing ring of a ball bearing
11 Outer bearing ring of a ball bearing
12 Bearing device of the fixed bearing
13 Bearing device/bearing bushing of the floating bearing
14 Bearing sleeve
15 Pivot ring
16 Inner ring of the pivot ring
17 Support disk
18 Outer ring of the pivot ring
19 Torsion web
20 Thrust piece
21 Screw
22 Screw ring
23 Longitudinal axis of the pinion shaft/of the connecting element/of a ball bearing
24 Inner bushing of the bearing bushing
25 Outer bushing of the bearing bushing
26 Connecting portion of the bearing bushing
27 Projection of the inner bushing
20 Projection of the outer bushing
29 Annular gap between the inner bushing and the outer bushing
30 Elastomer casing of the bearing bushing
31 Depression of the inner bushing
32 Depression of the outer bushing
33 Radial axis through the connecting portion of the bearing bushing
34 Delimiting element
35 Stop element
36 Connecting element
37 Shell opening

The invention claimed is:

1. A steering gear for a steering system of a motor vehicle, comprising:
a housing;
a toothed wheel;
a fixed bearing, including:
  a bearing sleeve;
  a rotary bearing received in the bearing sleeve, and having an outer bearing ring; and
  a pivot ring having:
    one or more torsion webs;
    an outer ring fixed to the housing; and
    an inner ring pivotably connected to the outer ring via the one or more torsion webs, and connected to or integrated into the bearing sleeve;
a floating bearing including a further rotary bearing mounted within the housing so as to be radially mobile, the further rotary bearing having a further outer bearing ring;
a connecting element that connects the further outer bearing ring to one or more of the bearing sleeve and the outer bearing ring of the rotary bearing of the fixed bearing such that the connecting element conducts a load that causes tilting of the outer ring of the fixed bearing to the further outer ring of the floating bearing; and
a pinion shaft, including:
  a first portion received in the rotary bearing of the fixed bearing;
  a second portion received in the further rotary bearing of the floating bearing; and
  a pinion that meshes with the toothed wheel, the pinion located between the first portion and the second portion,
wherein the connecting element is at least partially shaped as a hollow cylindrical tube.

2. The steering gear as claimed in claim 1, wherein:
the floating bearing further includes a bearing bushing fixed to the housing, and having an inner bushing, and an outer bushing that surrounds the inner bushing;
the further rotary bearing is received in the inner bushing;
the outer bushing and the inner bushing delimit an annular gap; and
the outer bushing and the inner bushing are connected to each other via a flexible connecting portion such that the outer bushing and the inner bushing are movable relative to each other in at least one radial direction.

3. The steering gear as claimed in claim 2, wherein one or more of:
one or more of the bearing sleeve and the connecting element is formed from metal; and
the bearing bushing is formed from plastic or an elastomer.

4. The steering gear as claimed in claim 1, wherein the connecting element is integral with the bearing sleeve of the fixed bearing.

5. The steering gear as claimed in claim 4, wherein the connecting element is formed in one piece with the bearing sleeve.

6. The steering gear as claimed in claim 5, wherein the connecting element is formed materially integrally with the bearing sleeve.

7. The steering gear as claimed in claim 1, wherein one or more of the rotary bearing of the fixed bearing and the rotary bearing of the floating bearing is a single-row radial ball bearing.

8. A steering gear for a steering system of a motor vehicle, comprising:
a housing;
a toothed wheel;

a fixed bearing, including:
   a bearing sleeve;
   a rotary bearing received in the bearing sleeve, and having an outer bearing ring; and
   a pivot ring having:
      one or more torsion webs;
      an outer ring fixed to the housing; and
      an inner ring pivotably connected to the outer ring via the one or more torsion webs, and connected to or integrated into the bearing sleeve;
a floating bearing including a further rotary bearing mounted within the housing so as to be radially mobile, the further rotary bearing having a further outer bearing ring connected to one or more of the bearing sleeve and the outer bearing ring of the rotary bearing of the fixed bearing via a connecting element; and
a pinion shaft, including:
   a first portion received in the rotary bearing of the fixed bearing;
   a second portion received in the further rotary bearing of the floating bearing; and
   a pinion that meshes with the toothed wheel, the pinion located between the first portion and the second portion,
wherein:
   the floating bearing further includes a bearing bushing fixed to the housing, and having an inner bushing, and an outer bushing that surrounds the inner bushing;
   the further rotary bearing is received in the inner bushing;
   the outer bushing and the inner bushing delimit an annular gap;
   the outer bushing and the inner bushing are connected to on each other via a flexible connecting portion such that the outer bushing and the inner bushing are movable relative to each other in at least one radial direction
   the further rotary bearing of the floating bearing is mounted within a portion of the connecting element; and
   the portion of the connecting element or a further portion of the connecting element is mounted within the bearing bushing of the floating bearing.

9. The steering gear as claimed in claim 8, wherein the connecting element is at least partially of tubular form.

10. A steering system, comprising:
a steering gear, including:
   a housing;
   a toothed wheel;
   a fixed bearing, having:
      a bearing sleeve;
      a rotary bearing received in the bearing sleeve, and having an outer bearing ring; and
      a pivot ring that includes:
         one or more torsion webs;
         an outer ring fixed to the housing; and
         an inner ring pivotably connected to the outer ring via the one or more torsion webs, and connected to or integrated into the bearing sleeve;
   a floating bearing including a further rotary bearing mounted within the housing so as to be radially mobile, the further rotary bearing having a further outer bearing ring; a connecting element that connects the further outer bearing ring to one or more of the bearing sleeve and the outer bearing ring of the rotary bearing of the fixed bearing such that the via a connecting element conducts a load that causes tilting of the outer ring of the fixed bearing to the further outer ring of the floating bearing; and
   a pinion shaft, having:
      a first portion received in the rotary bearing of the fixed bearing;
      a second portion received in the further rotary bearing of the floating bearing; and
      a pinion that meshes with the toothed wheel, the pinion located between the first portion and the second portion; and
a steering motor connected, with rotational driving action, to the pinion shaft of the steering gear,
wherein the connecting element is at least partially shaped as a hollow cylindrical tube.

\* \* \* \* \*

UNITED STATES PATENT AND TRADEMARK OFFICE
CERTIFICATE OF CORRECTION

PATENT NO. : 12,157,521 B2
APPLICATION NO. : 16/463590
DATED : December 3, 2024
INVENTOR(S) : Hafermalz et al.

Page 1 of 1

It is certified that error appears in the above-identified patent and that said Letters Patent is hereby corrected as shown below:

In the Claims

In Claim 10, at Column 12, Lines 21-22:
"...the further rotary bearing having a further outer bearing ring; a connecting element..."
Should read:
--...the further rotary bearing having a further outer bearing ring;
a connecting element...--.

In Claim 10, at Column 12, Lines 24-25:
"such that the via a connecting element"
Should read:
--such that the connecting element--.

Signed and Sealed this
Fifteenth Day of July, 2025

Coke Morgan Stewart
*Acting Director of the United States Patent and Trademark Office*